United States Patent
Lee et al.

(10) Patent No.: US 11,019,501 B2
(45) Date of Patent: *May 25, 2021

(54) METHOD FOR DETERMINING VALID SUBFRAME FOR NON-LICENSED BAND IN WIRELESS COMMUNICATION SYSTEM, AND APPARATUS USING THE METHOD

(71) Applicant: LG ELECTRONICS INC., Seoul (KR)

(72) Inventors: Seungmin Lee, Seoul (KR); Joonkui Ahn, Seoul (KR); Hanjun Park, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,001

(22) Filed: Oct. 9, 2019

(65) Prior Publication Data

US 2020/0045557 A1  Feb. 6, 2020

Related U.S. Application Data

(60) filed as application No. PCT/KR2016/009255 on Aug. 22, 2016, now Pat. No. 10,470,049.

(Continued)

(51) Int. Cl.
*H04W 16/14* (2009.01)
*H04L 1/00* (2006.01)
(Continued)

(52) U.S. Cl.
CPC .......... *H04W 16/14* (2013.01); *H04L 1/0026* (2013.01); *H04L 1/04* (2013.01); *H04L 5/001* (2013.01);
(Continued)

(58) Field of Classification Search
CPC .......... H04W 72/0406; H04W 72/0808; H04L 5/001; H04L 5/0048; H04L 1/0026; H04L 1/04

See application file for complete search history.

(56) References Cited

U.S. PATENT DOCUMENTS

| | | |
|---|---|---|
| 2011/0141987 A1 | 6/2011 | Nam et al. |
| 2015/0264669 A1 | 9/2015 | Kim et al. |

(Continued)

FOREIGN PATENT DOCUMENTS

| | | |
|---|---|---|
| CN | 104333902 A | 2/2015 |
| CN | 105848165 A | 8/2016 |

OTHER PUBLICATIONS

Ericsson; "PHY-Layer Options to Support CSI Measurements and Reporting for LAA"; 3GPP TSG RAN WG1 Ad-hoc Meeting Paris, France, Mar. 24-26, 2015; R1-151138 (Year: 2015).*

(Continued)

*Primary Examiner* — Gary Mui
(74) *Attorney, Agent, or Firm* — Birch, Stewart, Kolasch & Birch LLP

(57) ABSTRACT

A method of deriving channel state information in an unlicensed band, which is performed by a user equipment, includes based on a subframe being in a cell on the unlicensed band and all of orthogonal frequency division multiplexing (OFDM) symbols of the subframe being occupied by a base station, and based on a channel state information-reference signal (CSI-RS) resource being in the subframe, considering the subframe as a valid subframe, deriving the channel state information in the valid subframe, and transmitting the channel state information to the base station.

15 Claims, 12 Drawing Sheets

Related U.S. Application Data

(60) Provisional application No. 15/753,840, provisional application No. 62/207,935, filed on Aug. 21, 2015, provisional application No. 62/209,317, filed on Aug. 24, 2015, provisional application No. 62/244,695, filed on Oct. 21, 2015.

(51) Int. Cl.
  *H04L 1/04* (2006.01)
  *H04L 5/00* (2006.01)
  *H04W 72/04* (2009.01)
  *H04W 74/08* (2009.01)

(52) U.S. Cl.
  CPC ....... *H04L 5/0048* (2013.01); *H04W 72/0406* (2013.01); *H04W 74/0808* (2013.01); *H04L 1/0031* (2013.01); *H04L 5/0053* (2013.01)

(56) References Cited

U.S. PATENT DOCUMENTS

| | | |
|---|---|---|
| 2016/0227489 A1 | 8/2016 | Oteri et al. |
| 2017/0117997 A1 | 4/2017 | Park et al. |
| 2017/0289818 A1 | 10/2017 | Ng et al. |
| 2018/0145851 A1 | 5/2018 | Kusashima et al. |

OTHER PUBLICATIONS

Alcatel-Lucent et al., "DCI Transmission for the DL Partial Subframe in LAA", 3GPP TSG RAN WG1 Meeting #81, R1-152994, Fukuoka, Japan, May 25-29, 2015, pp. 1-4.

Nokia Networks,"On CSI reporting and Transmission Modes for LTE LAA", R1-154452, 3GPP TSG-RAN WG1 Meeting #82, Beijing, P.R. China, Aug. 24-28, 2015; 7 pgs.

Qualcomm Incorporated,"DRX operation and PHY layer aspects in LAA", R1-152787, 3GPP TSG RAN WG1 #81, May 25-29, 2015, Fukuoka, Japan, 5 pgs.

Qualcomm Incorporated "UE procedure for receiving DL transmissions in LAA", R1-152786, 3GPP TSG RAN WG1 #81, May 25-29, 2015, Fukuoka, Japan, 5 pgs.

Samsung,"CCA threshold and transmission power for LAA", R1-154139, 3GPP TSG RAN WG1 #82, Beijing, China, Aug. 24-28, 2015, 6 pgs.

Samsung,"LAA CSI measurements", R1-154153, 3GPP TSG RAN WG1 Meeting #82, Beijing, China, Aug. 24-28, 2016, 4 pgs.

U.S. Appl. No. 15/753,840, filed Feb. 20, 2018.

\* cited by examiner

FIG. 9
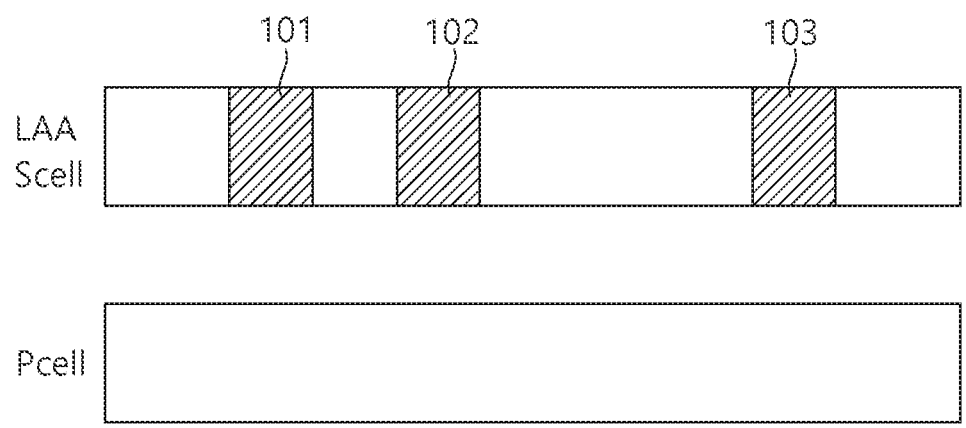
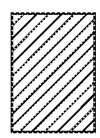 : Subframe in which BS can use all OFDM symbols

Subframe
(201, 202, 203) : Subframe in which BS can use all OFDM symbols

Subframe   : Subframe in which CSI-RS resource associated
(202)        with CSI process is configured (/existed)

METHOD FOR DETERMINING VALID SUBFRAME FOR NON-LICENSED BAND IN WIRELESS COMMUNICATION SYSTEM, AND APPARATUS USING THE METHOD

CROSS-REFERENCE TO RELATED APPLICATIONS

This application is a Continuation of U.S. patent application Ser. No. 15/753,840, filed on Feb. 20, 2018 (now U.S. Pat. No. 10,470,049, issued on Nov. 5, 2019), which was filed as the National Phase of PCT International Application No. PCT/KR2016/009255, filed on Aug. 22, 2016, which claims priority under 35 U.S.C. 119(e) to U.S. Provisional Application No. 62/207,935, filed on Aug. 21, 2015, No. 62/209,317, filed on Aug. 24, 2015 and No. 62/244,695, filed on Oct. 21, 2015, all of these applications are hereby expressly incorporated by reference into the present application.

BACKGROUND OF THE INVENTION

Field of the Invention

The present invention relates to a wireless communication, more particularly to a method for determining a valid subframe for an unlicensed band cell in a wireless communication system and an apparatus using this method.

Description of the Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

$3^{rd}$ Generation Partnership Project (3GPP) provides LTE-Advanced (LTE-A) improved from Long Term Evolution (LTE) based on Orthogonal Frequency Division Multiple Access (OFDMA)/Single Carrier-Frequency Division Multiple Access (SC-FDMA) transmission schemes as a system standard to satisfy the requirements of IMT-Advanced. LTE-Advanced is one of strong candidates for IMT-Advanced.

In the existing LTE-A, up to five carriers (cells) are aggregated to provide Carrier Aggregation (CA), but, in the future wireless communication system, considered is eCA (enhanced CA) aggregating up to 32 carriers. The eCA may also be referred to as a massive CA.

On the other hand, in future radio communication systems, carrier aggregation of cells in the permitted band and cells in the unlicensed band is also considered. The related technology is LAA (Licensed-Assisted Access using LTE). LAA means a technology that bundles the licensed band and the unlicensed band into one using the carrier aggregation technique, with the LTE licensed band as an anchor. A terminal always uses the service by accessing the network with the unlicensed band, and a base station may aggregate the licensed band and the unlicensed band with the carrier aggregation according to the situation to offload the traffic of the licensed band into the unlicensed band. In this carrier aggregation, the licensed band can become a primary cell (PCell) and the unlicensed band can be used as a secondary cell (SCell). The unlicensed band is active only through carrier aggregation and may not perform LTE communication independently.

Such a cell in the unlicensed band is not guaranteed to be always available to the base station and the terminal. Therefore, it is unreasonable to apply the CSI reporting method defined for the cell of the existing licensed band equally to the cells of the unlicensed band. In particular, a CSI reference resource to be measured for CSI reporting is defined only for a valid subframe, and it may be a problem how to determine the valid subframe in the cell of the unlicensed band.

SUMMARY OF THE INVENTION

The present invention provides a method for determining a valid subframe for an unlicensed band cell in a wireless communication system and an apparatus using the method.

In one aspect, provided is a method for determining a valid subframe for an unlicensed band cell in a wireless communication system. The method includes determining whether all of orthogonal frequency division multiplexing (OFDM) symbols of a subframe in the cell are available, and determining whether the subframe is a valid subframe based on whether a channel state information-reference signal (CSI-RS) resource exists in the subframe, when all of the OFDM symbols of the subframe are available.

The subframe may be determined as the valid subframe, when the CSI-RS exists resource in the subframe.

The cell in the unlicensed cell may be aggregated in carriers with a cell in a license cell.

The cell in the license cell may be used as a primary cell, and the cell in the unlicensed band is used as a secondary cell.

The valid subframe may be a valid downlink subframe or a valid special subframe.

A transmission power value or a clear channel assessment (CCA) threshold may be informed to a terminal.

The CCA threshold may be a value for determining whether the cell in the unlicensed band is accessible, and if the CCA threshold is high, an access probability may be high, and if the CCA threshold is low, the access probability may be low.

The transmission power value may be in an inversely proportional relationship to the CCA threshold.

In another aspect, provided is a wireless apparatus. The wireless apparatus includes a radio frequency (RF) unit and a processor coupled to the RF unit. The processor is configured to determine whether all of orthogonal frequency division multiplexing (OFDM) symbols of a subframe in an unlicensed cell are available, and determine whether the subframe is a valid subframe based on whether a channel state information-reference signal (CSI-RS) resource exists in the subframe, when all of the OFDM symbols of the subframe are available.

According to the present invention, a valid subframe can be determined in consideration of the characteristics of an unlicensed band cell. Unnecessary or meaningless measurement in a terminal can be prevented, and thus waste in power can be prevented.

BRIEF DESCRIPTION OF THE DRAWINGS

FIG. 9 shows an example of a valid subframe related to UCELL (LAA Scell) (which can be used/considered as a CSI reference resource).

DETAILED DESCRIPTION OF THE INVENTION

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). 3rd Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE. In order to clarify a description, a situation in which the present invention is applied to an LTE-A system is assumed, but the technical spirit of the present invention is not limited thereto.

Figure 1:
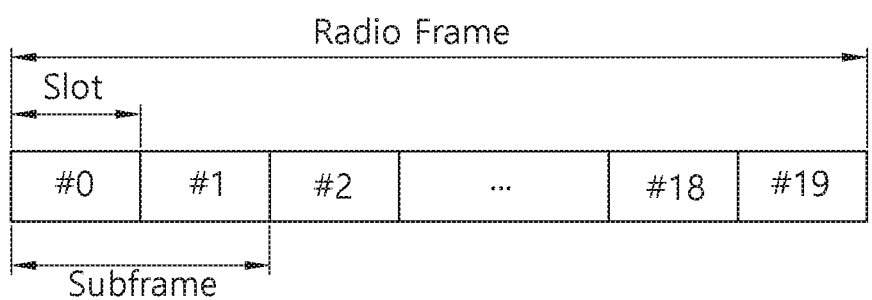
FIG. 1 shows the structure of a radio frame in 3GPP LTE/LTE-A.

FIG. 1 shows the structure of a radio frame in 3GPP LTE/LTE-A.

Referring to FIG. 1, the radio frame includes 10 subframes, and each of the subframes includes 2 slots. The slots within the radio frame are given slot numbers from #0 to #19. The time that is taken for one subframe to be transmitted is called a Transmission Time Period (TTI). The TTI can be called a scheduling unit for data transmission. For example, the length of one radio frame can be 10 ms, the length of one subframe can be 1 ms, and the length of one slot can be 0.5 ms. The structure of the radio frame is only an example. Accordingly, the number of subframes included in the radio frame or the number of slots included in the subframe can be changed in various ways.

Figure 2:
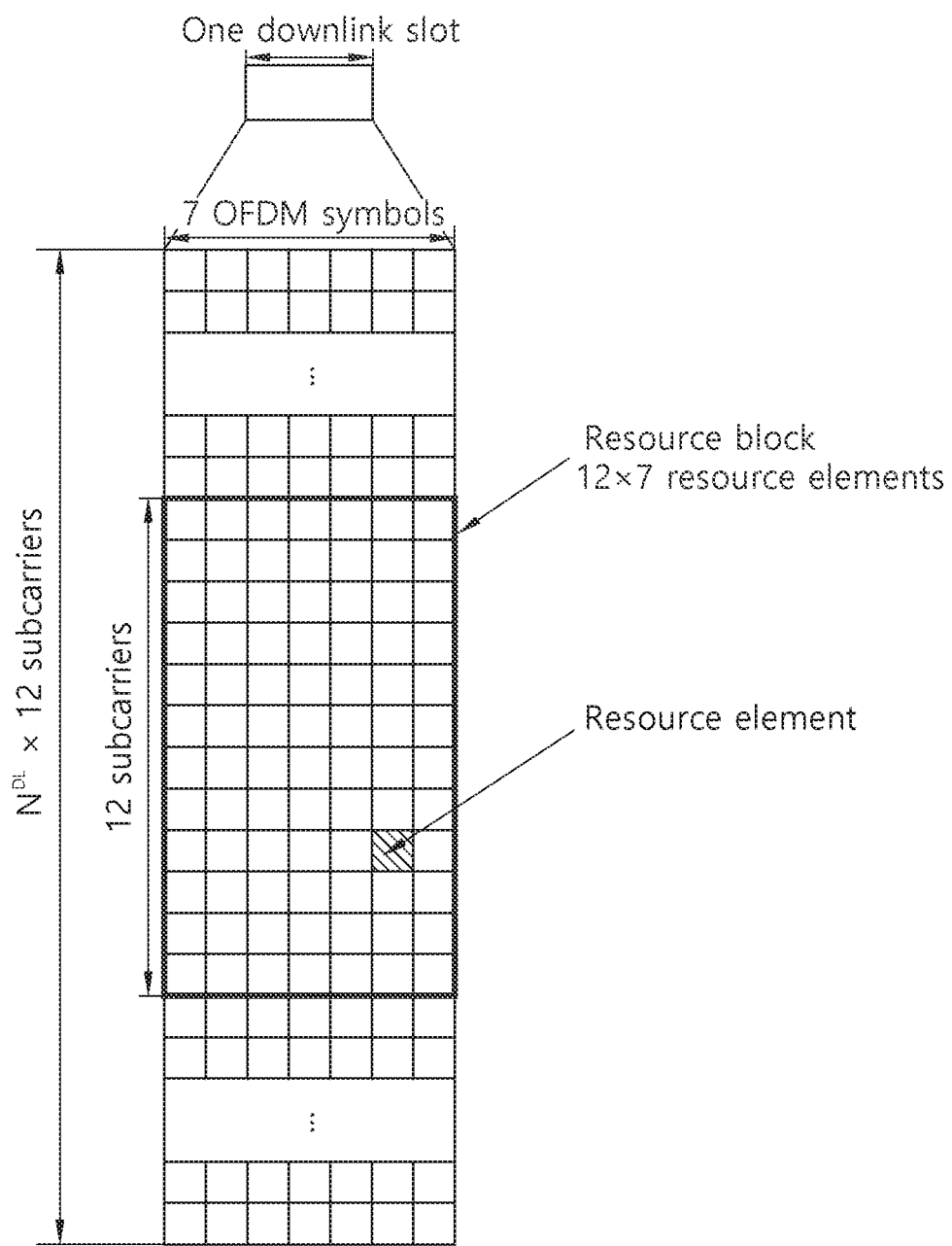
FIG. 2 shows an example of a resource grid for one slot.

FIG. 2 shows an example of a resource grid for one slot.

The slot includes a downlink slot and an uplink slot. The downlink slot includes a plurality of Orthogonal Frequency Division Multiplexing (OFDM) symbols in a time domain. The OFDM symbol indicates a specific time period, and the OFDM symbol may also be called an SC-FDMA symbol depending on a transmission method. The downlink slot includes an $N_{RB}$ number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, k (k=0, ... , $N_{RB} \times 12-1$) is a subcarrier index within the frequency domain, and l (l=0, ... , 6) is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of subcarriers.

Figure 3:
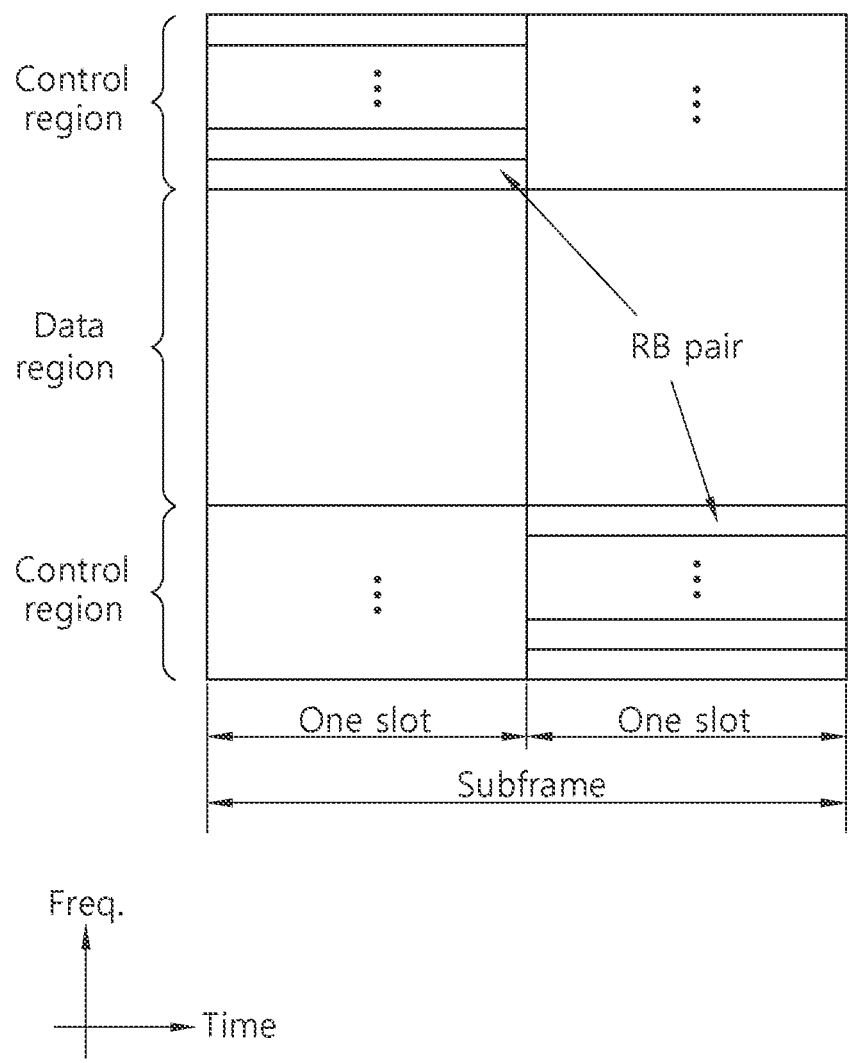
FIG. 3 shows the structure of an uplink subframe.

FIG. 3 shows the structure of an uplink subframe.

The uplink subframe can be divided into a control region and a data region in a frequency domain. Physical uplink control channels (PUCCHs) on which uplink control information is transmitted is allocated to the control region. Physical uplink shared channels (PUSCHs) on which data are transmitted are allocated to the data region. A terminal may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK (also indicated as a HARA-ACK), Channel State Information (CSI) indicative of a downlink channel state, a Scheduling Request (SR), that is, an uplink radio resource allocation request, etc. The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc. The PMI and RI may be the CSI reported by a terminal to support a multi-input multi-output (MIMO) operation.

A PUSCH is mapped to an uplink shared channel (UL-SCH), that is, a transport channel. Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, only the UCI is sent in the PUSCH.

Figure 4:
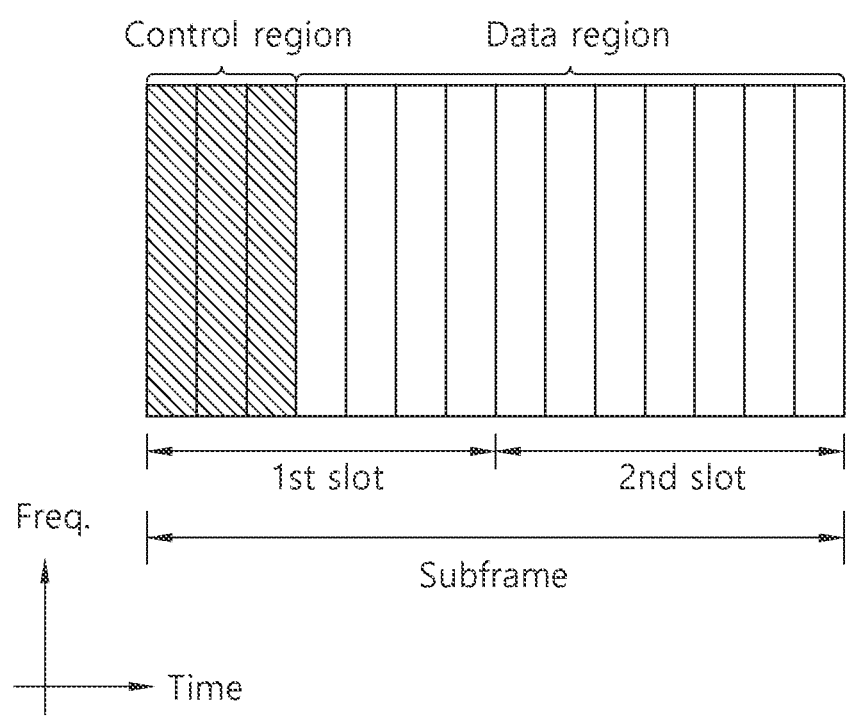
FIG. 4 shows the structure of a downlink subframe.

FIG. 4 shows the structure of a downlink subframe.

The downlink subframe includes two slots in a time domain, and each of the slots includes 7 OFDM symbols in a normal CP. A maximum of former 3 OFDM symbols (i.e., a maximum of 4 OFDM symbols for a 1.4 MHz bandwidth) in the first slot within the downlink subframe corresponds to a control region to which control channels are allocated, and the remaining OFDM symbols correspond to a data region to which Physical Downlink Shared Channels (PDSCHs) are allocated. The PDSCH means a channel on which data is transmitted from a BS or a node to UE.

Control channels transmitted in the control region include a physical control format indicator channel (PCFICH), a physical hybrid-ARQ indicator channel (PHICH), and a physical downlink control channel (PDCCH).

A PCFICH transmitted in the first OFDM symbol of the subframe carries a Control Format Indicator (CFI), that is, information about the number of OFDM symbols (i.e., the size of the control region) that is used to send control channels within the subframe. A terminal first receives a CFI on a PCFICH and then decodes a PDCCH. Unlike a PDCCH, a PCFICH does not use blind decoding, and the PCFICH is transmitted through the fixed PCFICH resource of a subframe.

A PHICH carries an acknowledgement (ACK)/not-acknowledgement (NACK) signal for an uplink Hybrid Automatic Repeat request (HARQ). An ACK/NACK signal for uplink data transmitted by UE is transmitted through a PHICH.

A PDCCH is a control channel on which Downlink Control Information (DCI) is transmitted. The DCI can include the allocation of PDSCH resources (also called downlink grant (DL grant)), the allocation of physical uplink shared channel (PUSCH) resources (also called an uplink grant (UL grant)), a set of transmit power control commands for individual UEs within any terminal group and/or the activation of a Voice over Internet Protocol (VoIP) may be included.

Figure 5:
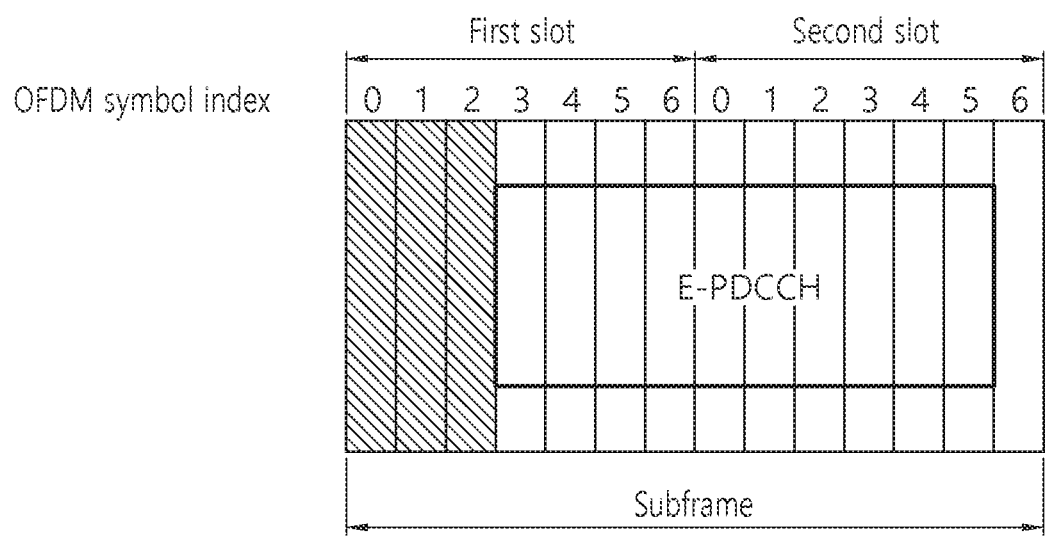
FIG. 5 illustrates an EPDCCH.

FIG. 5 illustrates an EPDCCH.

Referring to FIG. 5, the EPDCCH may be positioned after the existing control region in time domain. For example, if an existing control region is transmitted in the first three OFDM symbols of a subframe, the EPDCCH may be positioned in OFDM symbols positioned after the three OFDM symbols. In the frequency domain, the existing control area and the EPDCCH may be coincident or may be configured differently. For example, the PDCCH is transmitted in the entire system band, whereas the EPDCCH can be transmitted only in the same frequency band as the PDSCH transmitted for a specific terminal. FIG. 5 shows an example in which the EPDCCH is transmitted only in some frequency bands of the conventional control region. In the EPDCCH, control information for an advanced UE can be transmitted. In EPDCCH, a reference signal transmitted for demodulation of the PDSCH can be transmitted.

<Carrier Aggregation: CA>

Now, a carrier aggregation system will be described.

Figure 6:
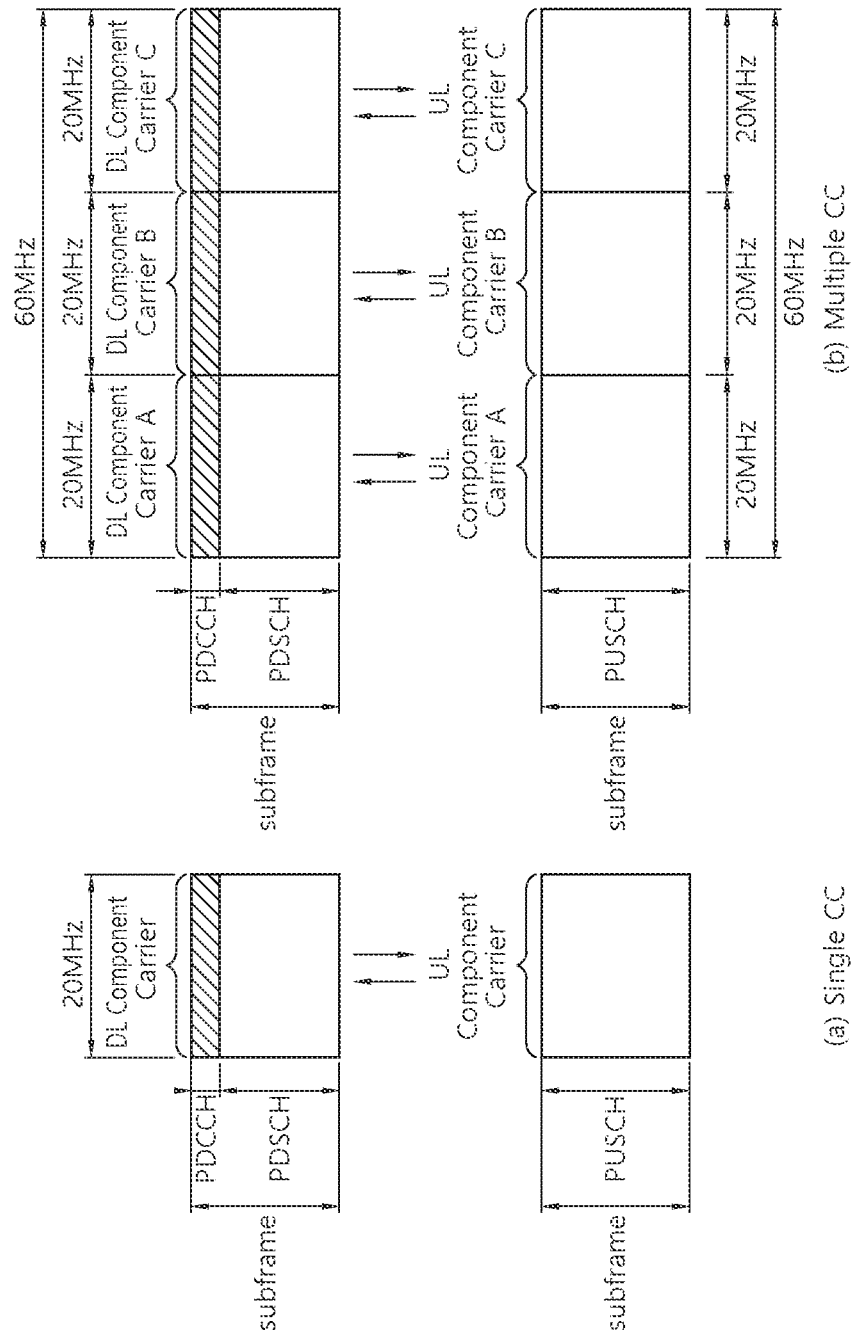
FIG. 6 shows an example of comparing a carrier aggregation system with the conventional single carrier system.

FIG. 6 shows an example of comparing a carrier aggregation system with the conventional single carrier system.

Referring to FIG. 6, the single-carrier system supports only one carrier for a UE in an uplink (UL) and a downlink (DL). Although the carrier may have various bandwidths, only one carrier is assigned to the terminal. Meanwhile, in a carrier aggregation system, a plurality of component carriers (CCs), i.e., DL CCs A to C and UL CCs A to C may be allocated to the terminal. The component carrier (CC) means a carrier which is used in the carrier aggregation system, and may be referred to as a carrier. For example, three 20 MHz CCs can be allocated to a terminal to allocate a 60 MHz bandwidth.

The carrier aggregation system can be divided into a contiguous carrier aggregation system in which carriers to be aggregated are contiguous to each other and a non-contiguous carrier aggregation system in which carriers are separated from each other. Hereinafter, when it is simply called the carrier aggregation system, it should be interpreted such that both cases where component carriers are contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

A system band of a wireless communication system is divided into a plurality of carrier frequencies. Herein, the carrier frequency implies a center frequency of a cell. Hereinafter, the cell may imply a DL frequency resource and a UL frequency resource. Alternatively, the cell may also imply a combination of a DL frequency resource and an optional UL frequency resource. In addition, in general, if carrier aggregation (CA) is not considered, UL and DL frequency resources may always exist in pair in one cell.

In order to transmit and receive packet data via a specific cell, the terminal first has to complete a configuration of the specific cell. Herein, the configuration implies a state in which system information required for data transmission and reception for the cell is completely received. For example, the configuration may include an overall procedure that requires common physical layer parameters necessary for data transmission and reception, MAC layer parameters, or parameters necessary for a specific operation in an RRC layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The terminal can monitor or receive a control channel (i.e., PDCCH) and a data channel (i.e., PDSCH) of an activated cell in order to confirm a resource (e.g., frequency, time, etc.) allocated to the terminal.

The deactivation implies that data transmission or reception is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

The cell can be classified into a primary cell, a secondary cell, and a serving cell.

The primary cell implies a cell that operates at a primary frequency, and implies a cell in which the terminal performs an initial connection establishment procedure or a connection re-establishment procedure with respect to a base station or a cell indicated as the primary cell in a handover procedure.

The secondary cell implies a cell that operates at a secondary frequency, and once an RRC connection is established, the secondary cell is used to provide an additional radio resource.

When carrier aggregation is not configured or when the terminal cannot provide carrier aggregation, the serving cell is configured with the primary cell. If the carrier aggregation is configured, the term 'serving cell' indicates a cell configured for the terminal, and can consist of a plurality of cells. One serving cell may consist of one downlink component carrier (DL CC) or a pair of {DL CC, uplink (UL) CC}. The plurality of serving cells can be configured with a set consisting of a primary cell and one or a plurality of cells among secondary cells.

A primary component carrier (PCC) means a CC (component carrier) corresponding to the primary cell. The PCC is a CC that establishes an initial connection (or RRC connection) with the base station among several CCs. The PCC serves for connection (or RRC connection) for signaling related to a plurality of CCs, and is a special CC that manages UE context which is connection information related to the UE. In addition, the PCC establishes a connection with the UE, and thus always exists in an activation state when in an RRC connected mode. A DL CC corresponding to the primary cell is called a downlink primary component carrier (DL PCC), and a UL CC corresponding to the primary cell is called an uplink primary component carrier (UL PCC).

A secondary component carrier (SCC) implies a CC corresponding to the secondary cell. That is, the SCC is a CC allocated to the terminal in addition to the PCC, and the SCC is an extended carrier used by the UE for additional resource allocation or the like in addition to the PCC, and can operate either in an activation state or a deactivation state. The DL CC corresponding to the secondary cell is called a DL secondary CC (DL SCC), and a UL CC corresponding to the secondary cell is called a UL secondary CC (UL SCC).

The primary cell and the secondary cell have the following features.

First, the primary cell is used for PUCCH transmission. Second, the primary cell is always activated, whereas the secondary cell relates to a carrier which is activated/deactivated according to a specific condition. Third, when the primary cell experiences a radio link failure (RLF), RRC re-connection is triggered, the RRC re-connection is not triggered. Fourth, the primary cell can change by a handover procedure accompanied by a random access channel (RACH) procedure or security key modification. Fifth, non-access stratum (NAS) information is received through the primary cell. Sixth, the primary cell always composed of a pair of a DL PCC and a UL PCC. Seventh, for each terminal, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

Regarding a CC constructing a serving cell, a DL CC can construct one serving cell, or the DL CC can be connected to a UL CC to construct one serving cell. However, the serving cell is not constructed only with one UL CC.

Activation/deactivation of a CC is equivalent in concept to activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to the serving cell.

The number of component carrier waves aggregated between a downlink and an uplink may be configured differently. The case where the number of downlink CCs is equal to the number of uplink CCs is referred to as a symmetric aggregation, and the case where the number of downlink CCs is different from the number of uplink CCs is referred to as asymmetric aggregation. Also, the size (i.e. bandwidth) of the CCs may be different. For example, if five CCs are used for a 70 MHz band configuration, then they may be configured such as 5 MHz CC (carrier #0)+20 MHz CC (carrier #1)+20 MHz CC (carrier #2)+20 MHz CC+5 MHz CC (carrier #4).

As described above, the carrier aggregation system can support multiple component carriers (CCs) unlike a single carrier system. That is, the system can support a plurality of serving cells.

Such the carrier aggregation system can support a non-cross carrier scheduling and a cross carrier scheduling.

Figure 7:
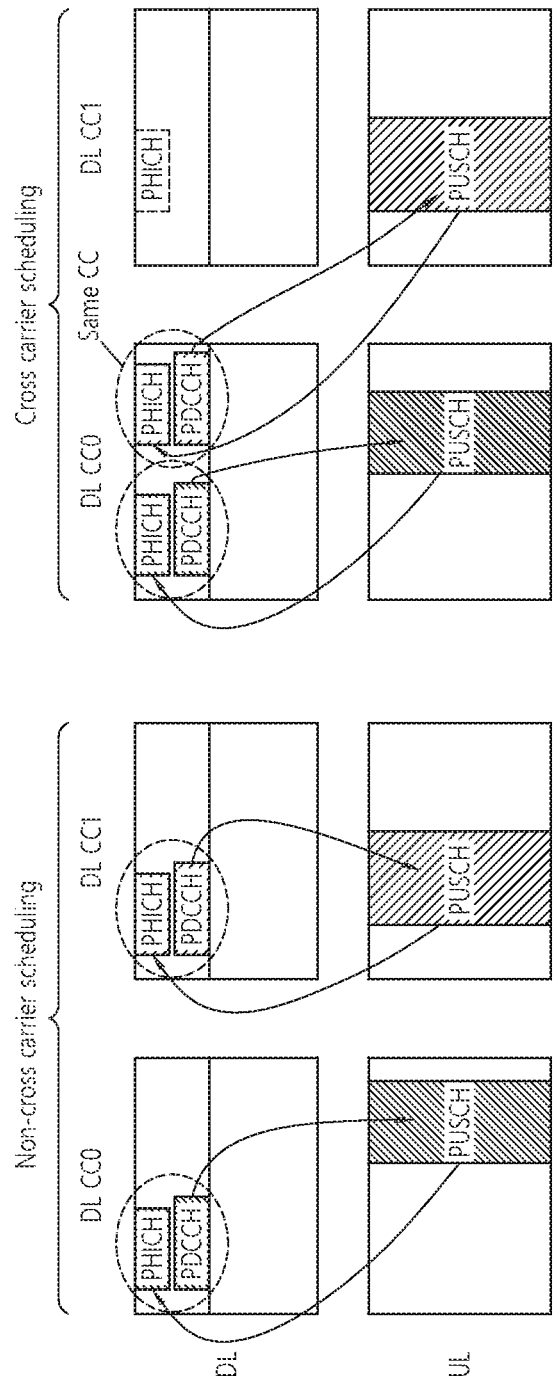
FIG. 7 illustrates the non-cross carrier scheduling and the cross carrier scheduling.

FIG. 7 illustrates the non-cross carrier scheduling and the cross carrier scheduling.

Non-cross-carrier scheduling may be referred to be as a method of simply extending and applying a conventional scheduling method in a single cell to a plurality of cells. If there is a PDSCH scheduled by a PDCCH, the PDCCH/PDSCH is transmitted through the same CC, and the PDCCH may schedule a PUSCH transmitted through a CC basically linked to a specific CC. The non-cross carrier scheduling may be referred to be as a self scheduling.

Cross-carrier scheduling (CCS) is a scheduling method capable of performing the resource assignment of PDSCHs transmitted through different CCs and/or the resource assignment of PUSCHs transmitted through CCs other than CCs basically linked to a specific CC, through a PDCCH transmitted through the specific CC. That is, a PDCCH and a PDSCH may be transmitted through different DL CCs, and a PUSCH may be transmitted through another UL CC other than an UL CC that is basically linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A carrier aggregation (CA) system supporting cross-carrier scheduling may include the Carrier Indication Field (CIF) in a conventional Downlink Control Information (DCI) format. In a system supporting cross-carrier scheduling, for example, in an LTE-A system, 3 bits may be extended because a CIF is added to an existing DCI format (i.e., a DCI format used in LTE), and in the structure of a PDCCH, an existing coding method and resource assignment method (i.e., resource mapping based on a CCE) may be reused.

The present invention will now be described.

The present invention proposes a method for efficiently performing a measurement operation (for example, a CSI measurement operation and/or an RRM measurement operation) for a Licensed-Assisted Access using LTE (LAA) carrier. Herein, for example, how to determine a valid subframe related to the corresponding measurement operation is also proposed.

Here, for example, the LAA refers to an LTE licensed band as an anchor, and is used for an authorized band (for example, PRIMARY CELL (/CARRIER)) and an unlicensed band (for example, SECONDARY CELL/CARRIER)) is bundled into one using a carrier aggregation technique. Herein, for example, allowing the terminal to use (basic) service (/communication) by initially accessing to a network (always) in the licensed band, the base station can configure (/signal) the licensed band and the unlicensed band with the carrier aggregation technique as needed (/required). Here, for example, through the corresponding (licensed/unlicensed band) carrier aggregation technique configuration (/signaling), it is possible to offload traffic of the licensed band to the unlicensed band, and/or increase DATA (RATE/THROUGHPUT) (by additionally using (radio) resources of the unlicensed band). Here, for example, when this type of (licensed/unlicensed band) carrier aggregation is configured (/signalled), the licensed band is configured (/signalled) in the primary cell, and the unlicensed band is configured (/signalled) in the secondary cell. Herein, for example, the unlicensed band may be activated as the secondary cell (/carrier) only with the carrier aggregation technique, and may not be activated for LTE communication independently (for example, as the primary cell (/carrier)).

In the present description, the LAA carrier, for example, may be an unlicensed band carrier. Here, for example, signal transmission may be performed based on LBT (LISTEN BEFORE TALK) operation and/or CS (CARRIER SENSING) operation in the LAA carrier. Here, for example, the (wireless) communication of the LAA carrier is performed in an aperiodic form (for example, opportunistically performed only when the result of performing the LBT (/CS) is "IDLE"), and thus channel state information (CSI) generation, and radio resource management (RRM) related measurement operation is required to be performed efficiently (so that the information (/state) at the time of actual (wireless) communication is reflected as much as possible (or accurately)).

For example, for convenience of explanation, hereinafter, a cell (for example, a secondary cell: SCELL) operating in the LAA carrier (and/or the unlicensed band) is referred to as a 'UCELL' and a cell operating in the licensed band (for example, a primary cell: PCELL) is referred to as 'LCELL'. Here, for example, the UCELL may be used as the secondary cell according to the LAA operation described above, and may also be referred to as a LAA SCELL in this sense. Here, for example, a resource period which is reserved// configured in an aperiodic manner in the UCELL (according to the result of performing LBT (/CS)) is referred to as a reserved resource period (RESERVED RESOURCE PERIOD: RRP). Here, for example, the RRP may be reserved (/configured) in units of sub-frames (/symbols) (preconfigured (/signalled)). Here, for example, if at least (base station) fails to occupy (reserve) a resource (for example, 14 OFDM symbols (NORMAL CP) of the minimum unit preconfigured (/signalled) related to one subframe configuration) on the UCELL, then it cannot be considered that a valid subframe (e.g., a valid downlink subframe, an effective special subframe) associated with the RRP and/or measurement operation is reserved (/configured).

For example, the downlink subframe (DOWNLINK SUBFRAME: DL SF) of the RRP period, i.e., the PDSCH related control information channel (or the uplink subframe (UPLINK SUBFRAME: UL SF), of the RRP period), which is transmitted on the subframe specified for the downlink purpose, i.e., the PUSCH-related control information channel transmitted on the subframe specified for the uplink purpose) can be configured to be transmitted from the LCELL (e.g., PCELL). That is, it may be 'CROSS CARRIER SCHEDULING (CCS)'. Also, in one example, the control information channel may be transmitted from the same UCELL as the data channel. That is, it may be 'SELF-SCHEDULING (SFS)'.

For example, the RRP period on the UCELL may be a resource that is configured to be aperiodic or discontinuous depending on the carrier sensing (CS) result. Considering this, the corresponding RRP period can be (re)defined (or (re)interpreted) in terms of terminal operation and assumptions.

For example, the RRP period in the UCELL may be (re)defined by at least one of 1) the period in which the terminal performs a (time/frequency) synchronization operation on the UCELL, 2) in a synchronization signal (e.g., PSS, SSS) for this is assumed to be transmitted from the base station, 3) the period in which the terminal performs a CSI measurement operation on a UCELL, or 4) in which a reference signal (e.g., CRS or CSI-RS) for this is assumed to be transmitted from the base station, or 5) the period in which the terminal performs a DCI detection operation related to data transmission (/reception) in the UCELL, and (6) the period in which the terminal performs a (temporary or provisional) buffering operation on a signal received in the UCELL.

When a transmitting node (e.g., a base station) simultaneously transmits a downlink (DL) signal in some (or all) UCELL(s) based carrier aggregation (CA) techniques, the 'transmission power (TRANSMISSION POWER: TXP) sharing operation' can be performed by at least one of the following options.

1) Option 1: Fixed per carrier and the same maximum power is allocated.

2) Option 2: Fixed per carrier but maximum power is allocated differently.

3) Option 3: dynamically allocate the maximum power between (corresponding) carriers (at least) based on the number of carriers that are transmitted within each downlink transmission burst.

When the TXP value of all of the signals transmitted in the unlicensed band (U-BAND) is fixed, as the bandwidth to which the signal is transmitted increases (or the number of UCELL(s) to which the signal is (simultaneously) transmitted increases), the clear channel assessment (CCA) threshold may decrease. Here, for example, the CCA means, after performing a CS (/LBT) operation on a (shared) wireless channel, determining (/deciding) whether the channel is (physically) available (busy or idle). Here, for example, the CCA threshold may be a reference value when determining whether access (/availability) to the (shared) wireless channel is possible. Here, for example, if the CCA threshold value is high, the probability of occupying the (shared) wireless channel is high, whereas, if the CCA threshold is low, the probability of occupying the (shared) wireless channel may be low. Here, for example, the CCA threshold may be in an inversely proportional relationship to the transmit power. That is, a CCA threshold value may be applied to be low when a specific transmission terminal transmits a signal with a high transmission power in the unlicensed band, whereas a CCA threshold value may be applied to be high when a signal is transmitted with a low transmission power.

For example, if the transmit power ($P_H$) is less than or equal to 23 dBm, the CCA threshold value can be calculated as follows.

CCA threshold=−73 dBm/MHZ+(23 dBm−$P_H$)/(1 MHZ)   [Equation 1]

The following table illustrates the relationship between transmit power $P_H$, transmission band and CCA threshold.

TABLE 1

| transmit power ($P_H$) | transmission band (number of UCELL) | CCA threshold |
| --- | --- | --- |
| 23 dBm | 20 MHZ (one UCELL) | −60 dBm (−73 dBm/MHZ * 20 MHZ) |
| 23 dBm | 40 MHZ (two UCELLs) | −57 dBm (−73 dBm/MHZ * 40 MHZ) |
| 20 dBm | 20 MHZ (one UCELL) | −57 dBm (−70 dBm/MHZ * 20 MHZ) |
| 20 dBm | 40 MHZ (two UCELLs) | −54 dBm (−70 dBm/MHz * 40 MHz) |

That is, the CCA threshold value can be changed according to the transmission power value, the bandwidth of the signal transmitted in the unlicensed band (or the number of UCELL(s) in which signals are (simultaneously) transmitted).

The fact that the CCA threshold value is changed, as transmission power value and the bandwidth of the signal transmitted in the unlicensed band (or the number of UCELL(s) in which the signals are transmitted simultaneously) changes, can be interpreted that an external (maximum) interference reception level related to data transmission/reception on the UCELL(s) is changed For example, if the CCA threshold value is configured low, the external (maximum) interference reception level may be considered relatively low, whereas if the CCA threshold value is configured high, the external (maximum) interference reception level may be considered relatively high.

For example, the fact that the transmit power value related to data transmission/reception of a specific UCELL is changed in the time domain can be interpreted that the external (maximum) interference reception level is changed. In this case, if the transmission power value related to the data transmission/reception of the specific UCELL is configured to be low (i.e., if it is highly probable that other transmitting node(s) nearby determining that the channel is 'IDLE' state), then the external (maximum) interference reception level may be considered relatively high, whereas if the transmission power value related to the data transmission/reception of the specific UCELL is configured to be high (i.e., if it is highly probable that other transmitting node(s) nearby determining that the channel is 'BUSY' state), then the external (maximum) interference reception level may be considered relatively low.

Hereinafter, presented is a method for efficiently performing the UCELL(s) related measurement (e.g., INTERFERENCE/DESIGNED SIGNAL MEASUREMENT, RRM MEASUREMENT) when the level of external interference related to data transmission/reception on the UCELL is changed.

For example, the external interference reception level related to data transmission/reception on the UCELL can be changed for various reasons (as described above). For example, the external interference reception level related to data transmission/reception on the UCELL may be changed, due to at least one of change in the CCA threshold value, change in the number of UCELL(s) in which signals are simultaneously transmitted, change in the bandwidth of a signal transmitted in the unlicensed band (U-BAND) change in the transmit power related to data transmission/reception in the specific UCELL.

In the present invention, at least one of i) VALID CSI(/RRM) REFERENCE RESOURCE', ii)' VALID CSI (/RRM) MEASUREMENT RESOURCE', iii)' VALID CSI(/RRM) CALCULATION RESOURCE', iv)' RESOURCE (e.g. SUBFRAME) in which (VALID) DESIRED REFERENCE SIGNAL' (/'IMR') to be actually used for UCELL CSI(/RRM) information generation (/calculation) exists, related to the UCELL CSI (/RRM) report, may be defined as at least one of (1) a downlink subframe belonging to the UCELL RRP period, (2) a downlink subframe in which a predefined (or signalled) reference signal (e.g., CSI-RS (and/or CRS)) is actually transmitted even in the RRP period (or in which the predefined (or signalled) IMR is actually existed in the RRP period), (3) a downlink subframe in which a predefined (or signalled) reference signal is transmitted, regardless of the RRP period, (4) a downlink subframe which is actually scheduled in data (e.g., PDSCH) to the terminal. Hereinafter, a method is described in detail, in which (2) a downlink subframe in which a predefined (or signalled) reference signal (e.g., CSI-RS (and/or CRS)) is actually transmitted even in the RRP period (or in which the predefined (or signalled) IMR is actually existed in the RRP period), is determined as a valid subframe.

First, a CSI reference resource will be described.

Figure 8:
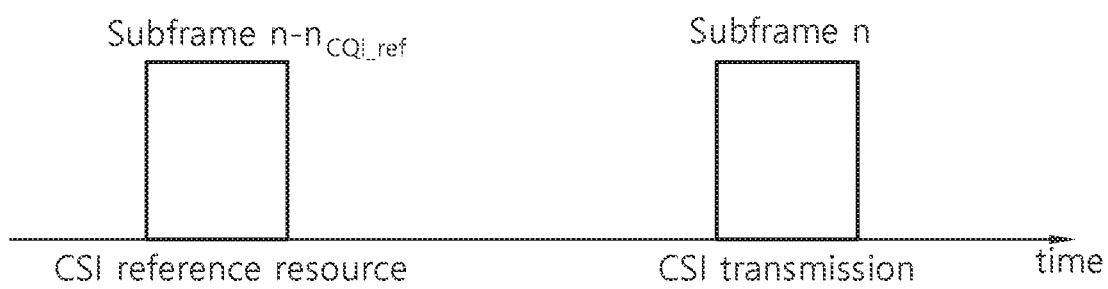
FIG. 8 illustrates a CSI transmission subframe and a CSI reference resource.

FIG. 8 illustrates a CSI transmission subframe and a CSI reference resource.

Referring to FIG. 8, when a subframe in which a terminal transmits the CSI is referred to as a subframe n, for example, the CSI reference resource (related to the transmitted CSI (measurement/calculation)) may be defined as a subframe $n\text{-}n_{CQI\_ref}$.

The subframe $n\text{-}n_{CQI\_ref}$ is defined only in a valid subframe (for example, a valid downlink subframe, valid special subframe) according to a predefined rule.

Now described is how to determine the valid subframe in the UCELL (which can be used/considered as the CSI reference resource).

FIG. 9 shows an example of a valid subframe related to UCELL (LAA Scell) (which can be used/considered as a CSI reference resource).

Referring to FIG. 9, a primary cell (Pcell) of the license band and a UCELL (LAA Scell) of the unlicensed band can be configured (/signalled) by the carrier aggregation technique. Here, for example, the valid subframe of UCELL (which may be used/considered as a CSI reference resource) may be a subframe in which the base station can occupy or use all OFDM symbols in a subframe. That is, in the UCELL, not all subframes can be valid subframes, but only subframes 101, 102, and 103, in which a base station can occupy or use all the OFDM symbols, can be the valid subframe. That is, if any subframe of the UCELL cannot occupy at least one OFDM symbol, it is not regarded as the valid subframe (effective downlink subframe or effective special subframe).

Figure 10:
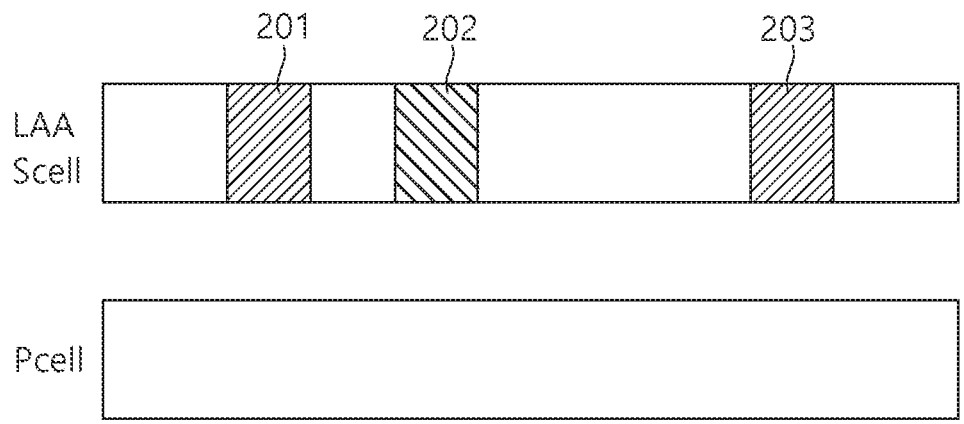
FIG. 10 shows an example of a valid subframe related to UCELL (LAA SCELL) (which can be used/considered as a CSI reference resource) when the transmission mode of a particular terminal is configured (/signalled) to transmission mode 9 or 10.

FIG. 10 shows an example of a valid subframe related to UCELL (LAA SCELL) (which can be used/considered as a CSI reference resource) when the transmission mode of a particular terminal is configured (/signalled) to transmission mode 9 or 10.

Referring to FIG. 10, the primary cell (Pcell) in the license band and the UCELL (LAA SCELL) of the unlicensed band can be configured (/signalled) by the carrier aggregation technique. Here, for example, when a transmission mode (related to UCELL (LAA SCELL)) is configured (/signalled) to a transmission mode 9 or 10 to a terminal to which the corresponding carrier aggregation technique is configured (/signalled), a valid subframe (which may be used/considered as CSI-RS reference resources) may be further restricted to a subframe in which the CSI-RS resources associated with a CSI process, are configured, among subframes in which a base station may occupy or use all OFDM symbols.

For example, when the subframes 201, 202, and 203 are subframes in which the base station can occupy or use all the OFDM symbols in a subframe, only the subframe 202 among these subframes may be a subframe in which the CSI-RS resource associated with the CSI process is configured. In this case, only the subframe 202 becomes the valid subframe.

The following table illustrates the transmission mode and the PDSCH transmission scheme for each transmission mode.

If the CSI-RS resource exists in the subframe, the wireless device considers the subframe as the valid subframe (S230). If it is determined as 'NO' in either of the two determination procedures, the subframe is not regarded as the valid subframe (S240).

Hereinafter, various examples and specific methods to which the present invention is applied will be described.

[Proposal Method #1] If at least one of 'data transmission (e.g., PDSCH, PDCCH) related transmission power value,' and 'reference signal (RS) (e.g., CRS, CSI-RS, DRS) transmission related transmit power value' on a specific UCELL, is changed in a time domain, then it is configured such that 'RESTRICTED CSI MEASUREMENT' operation is performed per a subframe set to which the same range (/category) of transmit power value is applied, depending on the subframe set (e.g., a predefined or signalled number (e.g., one) of UCELL RRP periods) to which the same transmit power value is applied, or a predefined rule (or predefined signalled information)

Alternatively, if at least one of 'data transmission related CCA threshold value' and 'reference signal transmission related CCA threshold value' is changed in the time domain on a specific UCELL, it may be configured such that 'restricted CSI measurement' operation is performed per the subframe set in which a subframe set to which the same CCA threshold value is applied (e.g., a predefined or signalled number of (e.g., one) UCELL RRP period) or per the subframe set to which the same range (/category) of CCA threshold is applied depending on a predefined rule (or signalled information).

TABLE 2

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0. Otherwise, Transmit diversity If the UE is configured without PMI/RI reporting: if the number of PBCH antenna ports is one, single-antenna port, port 0, otherwise transmit diversity. If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity. If the UE is configured with PMI/RI reporting or without PMI reporting: if the number of CSI-RS ports is one, single-antenna port, port 7; otherwise up to 8 layer transmission, ports 7-14) |
| 10 | If a CSI process of the UE is configured without PMI/RI reporting: if the number of CSI-RS ports is one, single-antenna port, port7; otherwise transmit diversity. If a CSI process of the UE is configured with PMI/RI reporting or without PMI reporting: if the number of CSI-RS ports is one, single-antenna port, port 7; otherwise up to 8 layer transmissions, ports 7-14. |

Figure 11:
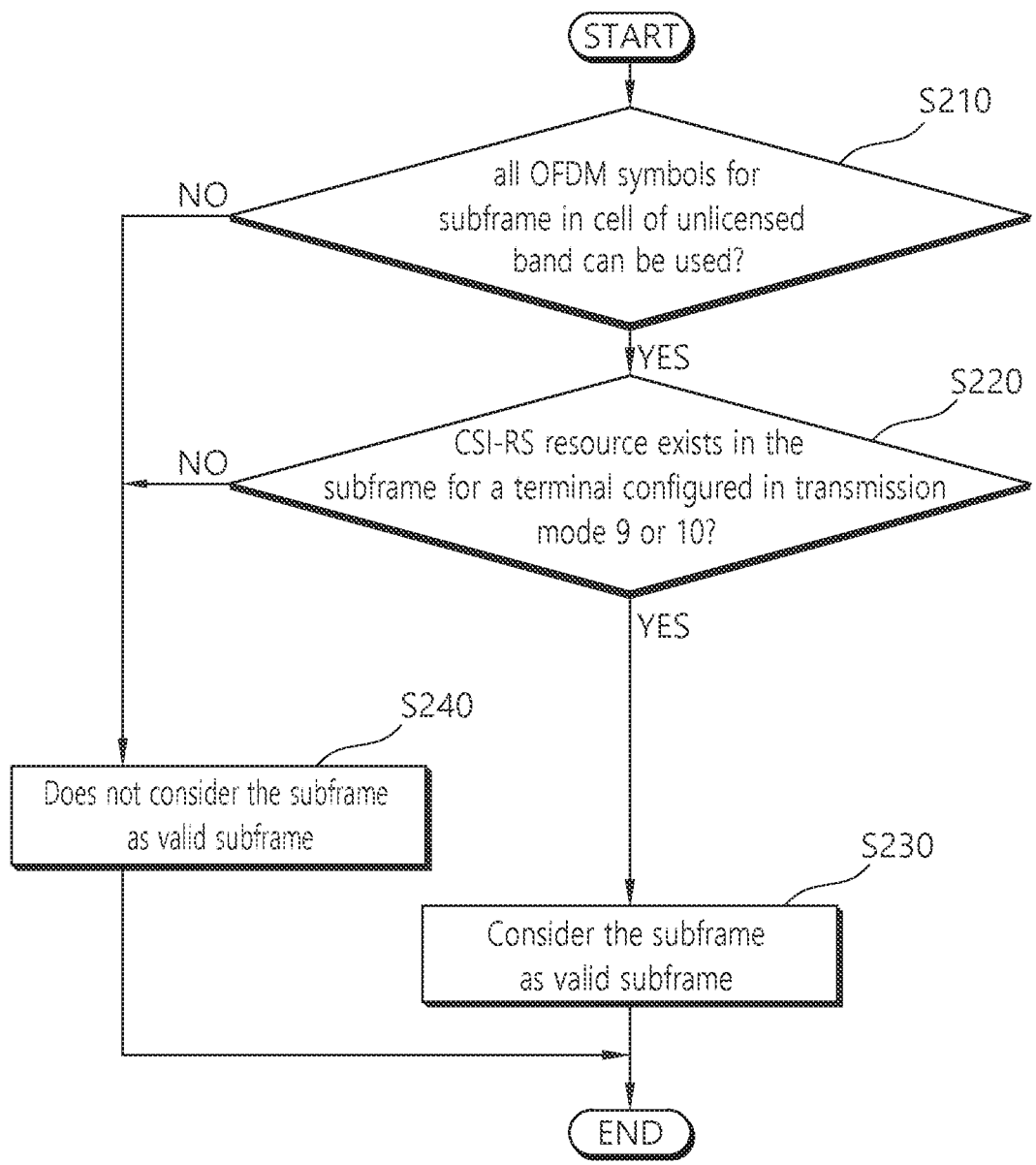
FIG. 11 illustrates a method for determining a valid subframe (which may be used/considered as a CSI reference resource) for a unlicensed band cell (UCELL, LAA Scell) according to an embodiment of the present invention.

FIG. 11 illustrates a method for determining a valid subframe (which may be used/considered as a CSI reference resource) for a unlicensed band cell (UCELL, LAA Scell) according to an embodiment of the present invention.

Referring to FIG. 11, the wireless device determines whether all OFDM symbols of the subframe of the UCELL can be occupied or used (S210).

If all the OFDM symbols of the UCELL subframe can be occupied or used, it is determined whether the CSI-RS resource exists in the subframe for the terminal configured in the transmission mode 9 or 10 (S220).

The 'restricted CSI measurement' operation may be interpreted in a restricted sense as a 'RESTRICTED INTERFERENCE MEASUREMENT' operation and/or a 'RESTRICTED RS MEASUREMENT' operation.

The 'transmit power value information per subframe set' or 'CCA threshold value information per subframe set' can be (dynamically) informed to the terminal by the base station through the predefined signaling (e.g., DCI).

The indicator indicating the transmit power value per subframe set or the CCA threshold value information per subframe set may be implicitly interpreted as a kind of 'RESTRICTED CSI MEASUREMENT SF SET INDICATOR.'

When a 'restricted CSI measurement' is performed according to [Proposal Method #1], if a specific CSI measurement subframe set (CSI measurement subframe set #A) related aperiodic CSI (A CSI) request message is received (or an A-CSI request message is received on a specific CSI measurement subframe set (CSI measurement subframe set #A)), then for 'the valid CSI reference resource' (or 'valid CSI measurement resource' or 'valid CSI calculation resource') related to the corresponding A-CSI reporting, only the subframe on the same CSI measurement subframe set #A is restrictedly considered and thus it may be defined to be determined (/selected) (depending on a method for determining a predefined CSI reference resource).

If the 'restricted CSI measurement' is performed according to [proposed method #1], then for 'the valid CSI reference resource' (or 'valid CSI measurement resource' or 'valid CSI calculation resource') of periodic CSI (P-CSI) report related to a particular CSI measurement subframe set (CSI measurement subframe set #A), only the subframe on the same CSI measurement set #A is restrictedly considered and thus it may be defined to be determined (/selected) (depending on a method for determining a predefined CSI reference resource).

Also, when a mode is configured in which 'data transmission related transmit power (/CCA threshold value)' and/or 'reference signal transmission related transmit power (CCA threshold value)' is changed in the time domain (for example, it is considered that 'restricted CSI measurement subframe set' is configured), 'it may be configured such that 'CSI request field size' on DCI format 0/4 (transmitted in UE-SPECIFIC SEARCH SPACE: USS) is increased to '2 bits' (from '1 bit').

When a measurement' is performed according to [Proposed Method #1], the rule may be defined in which the CSI report is performed by the terminal depending on a signalled (or preconfigured) CSI (e.g., P-CSI) report configuration information (e.g., period (/subframe offset/reporting mode etc.), (per restricted CSI measurement subframe set) per the subframe set to which the same transmit power (/CCA threshold) value is applied (e.g. predefined or signalled number of (e.g. one) UCELL RRP period) (or per the subframe set to which the same range (/category) of transmit power (/CCA threshold) is applied depending on the predefined rule or the signalled information).

When a 'restricted CSI measurement' is performed according to [Proposal Method #1], the rule may be defined in which the minimum value (and/or the maximum value and/or average value) is reported by the terminal (as a representative value), among the CSI (e.g. P-CSI) information (e.g., CQI/RI/PMI) related to the subframe set to which the same transmit power (/CCA threshold) value is applied (e.g. the predetermined or signalled number of (e.g. one) UCELL RRP period) (or the subframe set to which the same range (/category) of transmit power (/CCA threshold) is applied depending on the predefined rule (or signalled information)). In addition/alternatively, the rule may be defined such that predefined or signalled particular CSI information (e.g., RI (/CQI/PMI is relatively largest (smallest)) and/or higher (or lower) K (e.g., K=2) (P-)CSI(S) (e.g., may be valid only if the restricted CSI measurement subframe set is equal to or greater than 3), are (simultaneously) reported.

For example, the application of these rules may be interpreted such that 'the restricted CSI measurement' operation is performed per the subframe set to which the same transmit power (/CCA threshold) value is applied (or the subframe set to which the same range (/category) of transmit power (/CCA threshold) value is applied depending on the predefined rule (or signalled information)), and a conventional predefined (or signalled) representative (restrictive CSI subframe set related) (P-)CSI information (e.g., which is different from performing independent (P-) CSI report per the restricted CSI measurement subframe set) is reported.

Alternatively, if higher (or lower) K (e.g., K=2) (P-)CSI (S) and/or for which the minimum value (and/or maximum value and/or predetermined (or signalled) particular CSI information (e.g., RI (/CQI/PMI)) is relatively largest (or smallest) is reported (as the representative value), then 'restricted CSI measurement subframe set index' (and/or the corresponding 'UCELL (physical) ID') information related to the reported (P-)CSI(S) may be configured to be reported together.

[Proposal Method #2] When the transmit power value (and/or the transmit power value related to data transmission) related to transmission of a reference signal (e.g., CRS, CSI-RS, DRS) is changed in the time domain on a specific UCELL, it may be configured such that 'restricted RRM (e.g. RSRQ, RSSI, RSRP) measurement' operation is performed per the subframe set to which the same transmit power value is applied (e.g., predefined or signalled number of (e.g. one) UCELL RRP period) (or the subframe set to which the same range (/category) of transmit power value is applied depending on the predefined rule (or pre-signalled information)).

As another example, when a CCA threshold value related to transmission of a reference signal (and/or a CCA threshold value related to data transmission) is changed in a time domain on a specific UCELL, it may be configured such that 'restricted RRM measurement' operation is performed per the subframe set to which the same CCA threshold value is applied (e.g., predefined or signalled number of (e.g. one) UCELL RRP period) (or the subframe set to which the same range (/category) of CCA threshold value is applied depending on the predefined rule (or pre-signalled information)).

For example, by the terminal, it may be configured such that all measurement information (e.g., RSRQ, RSSI, RSRP) per the 'restricted RRM measurement subframe set' is reported through a predefined channel, or it may be configured such that the maximum value (and/or minimum value) among measurement information per the 'restricted RRM measurement subframe set' (and/or an average value of measurement information per 'restricted RRM measurement subframe set').

Herein, for example, when reporting the maximum value (and/or the minimum value), the 'UCELL (physical) ID' (and/or the 'restricted RRM measurement subframe set index') information corresponding to the maximum value (and/or minimum value) may also be configured to report together.

Alternatively, by the terminal, it may be configured such that a frequency with which a RSSI which is equal to or greater than (or is equal to or less than) a certain threshold (e.g., may be configured to the value such as X % of the average RSSI value) per the 'restricted RRM measurement subframe set,' is measured, a subframe index is measured in which the RSSI is measured, or the like, is reported by the terminal. Alternatively, it may be configured such that an average value of the RSSI measurement value equal to or greater than (or equal to or less than) a certain threshold value (e.g., may be configured as the value such as X % of the average RSSI value) is reported, or it may be configured such that the RSSI measurement is sorted in the order of amplitude, and then the value corresponding to higher (or lower) X % or an average value of the measured value belonging to the higher (lower) X % is reported.

In addition, the 'restricted RRM measurement' operation may be interpreted in restricted sense of a 'restricted RSRQ measurement' operation (and/or a 'restricted RSSI measurement' operation and/or a ' restricted RSRP measurement' operation).

Also, when a mode is configured in which the 'data transmission related transmit power (/CCA threshold) value' and/or 'reference signal transmission related transmit power (/CCA threshold) value' are changed in a time domain (for example, 'restricted RRM (/CSI) measurement subframe set' is considered to be configured), the 'RSSI measurement' in one subframe may be configured to be performed based on 'all OFDM symbols' rather than only the OFDM symbols containing CRS port 0.

In the described above [Proposal Method #1] and/or [Proposed Method #2], 1) when the 'transmit power value information per the subframe (set)' or 'the CCA threshold value information per the subframe (set)' related to the UCELL is signalled directly to the terminal, 2) when information on the start/end time of the UCELL RRP period is signalled (directly) to the terminal, 3) when the terminal identify (indirectly) information on the start/end time of the UCELL RRP period, then it can be valid for at least one of them.

In the proposed method, when the same or a certain value (or the same range (/category) of 'UCELL data transmission related transmit power (/CCA threshold)' and/or 'UCELL reference signal transmission related transmit power (/CCA threshold)' is guaranteed to be predefined or maintained at least during the signalled certain period, (and/or the information on the start/end time of the UCELL RRP period is signalled (directly) to the terminal, and/or the terminal can identify (directly) the information on the start/end time of the UCELL RRP period), presented is a method for performing efficiently UCELL(s) related measurement (e.g., interference/corresponding signal measurement, RRM measurement).

For example, the period (referred to as the 'EQ_INTERVEL') in which the same or a certain value (or the same range (/category) of 'UCELL data transmission related transmit power (/CCA threshold)' and/or 'UCELL reference signal transmission related transmit power (/CCA threshold)' is maintained, may be also specified as 'the predefined or signalled number of (e.g. one) UCELL RRP period.'

[Proposal Method #3] The 'valid CSI reference resource' (or 'valid CSI measurement resource' or 'valid CSI calculation resource) related to the UCELL CSI report (e.g., P-CSI, A-CSI) in a specific time (subframe #N) may be specified as a specific resource (subframe #K) on the EQ_INTERVEL. In this case, 'interference measurement' and/or 'desired reference signal (e.g., CRS, CSI-RS) measurement' related to the corresponding CSI information generation (/calculation) may be configured to use the 'valid CSI reference resource' (an 'interference measurement resource (IMR)' belonging to 'the period up to the 'valid CSI reference resource' (subframe #K)) and/or the 'desired reference signal' (and/or 'predefined (or signalled) (OFDM) symbol in which a reference signal of specific port index is included, derived from a method for determining the CSI reference resource predefined from the first subframe on the EQ_INTERVEL.

As a specific example, if the EQ_INTERVEL is configured to a predefined or signalled number of (e.g., one) UCELL RRP periods, and if the 'valid CSI reference resource' related to the UCELL CSI report to be performed on the (LCELL) subframe #6' is the subframe #5 (or the subframe #2) in the 'UCELL RRP period (e.g., RRP composed of 'subframe #0~subframe #9), then the terminal performs 'interference measurement' and/or 'desired reference signal measurement' related to the corresponding CSI information generation (/calculation), by using the 'desired reference signal' (and/or an (OFDM) symbol in which the predetermined (or signalled) reference signal of specific port index is included) and/or the 'IMR' belonging to the period from the' UCELL RRP subframe #0' to the ' UCELL RRP subframe #5' (or the subframe #2).

As another example, if the 'valid CSI reference resource' (or the 'valid CSI measurement resource' or the 'valid CSI calculation resource') related to the UCELL CSI report at the specific time (subframe #N) is specified as the closest EQ_INTERVEL (prior to and including the time of the subframe #(N−4)) or the specific resource (subframe #K) on a different EQ_INTERVEL other than the EQ_INTERVEL in the predefined (or signalled) 'time window (/duration), then it may be configured such that the 'interference measurement' and 'desired reference signal measurement' related to the corresponding CSI information generation (/calculation) is performed as 'ONE-SHOT resource based measurement' (or it may be configured such that the corresponding CSI information report operation is omitted or the corresponding CSI information report is performed as a predetermined specific value (e.g., CQI of 'OOR', RI of '1').

As another example, when the above [Proposed Method #3] is applied, the 'INTERFERENCE AVERAGING' (and/or 'averaging of the desired reference signal' and/or 'RRM (e.g., RSRQ, RSSI, RSRP)) operation can be configured to ('reset or initialize' in units of a predefined (or signalled) number of (e.g., one) EQ_INTERVEL).

[Proposed Method #4] The UCELL RRM report (e.g., RSRQ, RSSI, RSRP) related information generation (/calculation) of the specific time (subframe #N) may be configured to use the closest EQ_INTERVEL (prior to and including the time of the subframe #(N−4)) or the 'desired reference signal (and/or the OFDM symbol in which the predefined (or signalled) reference signal of specific port index is included) and/or the 'IMR' belonging to the 'EQ_INTERVEL in the predefined (or signalled) 'time window (/duration).''

If the [proposed method #4] is applied, then the 'RRM (e.g., RSRQ, RSSI, RSRP) averaging' (and/or the 'interference averaging' (and/or '(desired) reference signal averaging')) operation may be configured to be reset or initialized in units of (a predefined (or signalled) number of (e.g., one)) EQ_INTERVEL.

It is obvious that examples of the proposed scheme described above can also be included as one of the implementation methods of the present invention, and thus can be regarded as a kind of proposed schemes. In addition, the proposed schemes described above may be implemented independently, but they may be implemented by combining (or merging) some of the proposed schemes. For example, the (some or all) proposed schemes of the present invention may be applied not only to the case where the unlicensed band is activated (as the secondary cell (/carrier)) only through the carrier aggregation, but also to the case where it is activated independently for an LTE communication (e.g., as the primary cell (/carrier)). For example, the (some or all)

proposed schemes of the present invention may be applied only in a limited (preconfigured (/signalled)) transmission mode.

Figure 12:
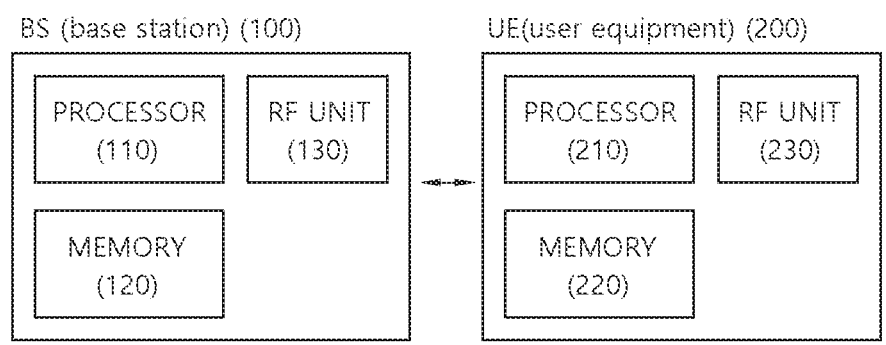
FIG. 12 is a block diagram illustrating a base station and a terminal.

FIG. 12 is a block diagram illustrating a base station and a terminal.

A BS 100 includes a processor 110, a memory 120, and an RF unit 130. The processor 110 implements a proposed function, process, and/or method. The memory 120 is connected to the processor 110 and stores various types of information for operating the processor 110. The RF unit 130 is connected to the processor 110 and transmits and/or receives a radio signal.

A UE 200 includes a processor 210, a memory 220, and an RF unit 230. The processor 210 implements a proposed function, process, and/or method. The memory 220 is connected to the processor 210 and stores various types of information for operating the processor 210. The RF unit 230 is connected to the processor 210 and transmits and/or receives a radio signal.

The processors 110 and 210 may include an ASIC (Application-Specific Integrated Circuit), a chip-set, a logical circuit, a data processor, and/or a converter for converting a baseband signal and a radio signal from each other. The memories 120 and 220 may include a ROM (Read-Only Memory), a RAM (Random Access Memory), a flash memory, a memory card, a storage medium, and/or any other storage devices. The RF units 130 and 230 may include one or more antennas for transmitting and/or receiving a radio signal. When the embodiments are implemented by software, the foregoing techniques may be implemented by modules (processes, functions, or the like) performing the foregoing functions. The modules may be stored in the memories 120 and 220 and executed by the processors 110 and 210, respectively. The memories 120 and 220 may be provided within or outside the processors 110 and 210 and may be connected to the processors 110 and 210 through a well-known unit, respectively.

What is claimed is:

1. A method of deriving channel state information in an unlicensed band, the method performed by a user equipment and comprising:
    based on a subframe being in a cell on the unlicensed band and all of orthogonal frequency division multiplexing (OFDM) symbols of the subframe being occupied by a base station, and based on a channel state information-reference signal (CSI-RS) resource being in the subframe, considering the subframe as a valid subframe;
    deriving the channel state information in the valid subframe; and
    transmitting the channel state information to the base station.

2. The method of claim 1, wherein the cell on the unlicensed band is aggregated with a cell on a licensed band.

3. The method of claim 2, wherein the cell on the licensed band is used as a primary cell, and the cell on the unlicensed band is used as a secondary cell.

4. The method of claim 1, wherein the valid subframe is a valid downlink subframe or a valid special subframe.

5. The method of claim 1, wherein a transmission power value or a clear channel assessment (CCA) threshold is informed to the user equipment.

6. The method of claim 5, wherein the CCA threshold is a value for determining whether the cell on the unlicensed band is accessible, and
    if the CCA threshold is higher than a threshold, an access probability is considered to be high, and if the CCA threshold is lower than the threshold, the access probability is considered to be low.

7. The method of claim 5, wherein the transmission power value is in an inversely proportional relationship to the CCA threshold.

8. A user equipment (UE), comprising:
    a transceiver; and
    a processor coupled to the transceiver,
    wherein the processor is configured to:
    based on a subframe being in a cell on an unlicensed band and all of orthogonal frequency division multiplexing (OFDM) symbols of the subframe being occupied by a base station, and based on a channel state information-reference signal (CSI-RS) resource being in the subframe, consider the subframe as a valid subframe,
    derive channel state information in the valid subframe, and
    transmit the channel state information to the base station.

9. The UE of claim 8, wherein the cell on the unlicensed band is aggregated with a cell on a licensed band.

10. The UE of claim 9, wherein the cell on the licensed band is used as a primary cell, and the cell on the unlicensed band is used as a secondary cell.

11. The UE of claim 8, wherein the valid subframe is a valid downlink subframe or a valid special subframe.

12. The UE of claim 8, wherein a transmission power value or a clear channel assessment (CCA) threshold is informed to the UE.

13. The UE of claim 12, wherein the CCA threshold is a value for determining whether the cell on the unlicensed band is accessible, and
    if the CCA threshold is higher than a threshold, an access probability is considered to be high, and if the CCA threshold is lower than the threshold, the access probability is considered to be low.

14. The UE of claim 13, wherein the transmission power value is in an inversely proportional relationship to the CCA threshold.

15. A processor for a wireless communication device in a wireless communication system,
    wherein the processor is configured to control the wireless communication device to:
    based on a subframe being in a cell on an unlicensed band and all of orthogonal frequency division multiplexing (OFDM) symbols of the subframe being occupied by a base station, and based on a channel state information-reference signal (CSI-RS) resource being in the subframe, consider the subframe as a valid subframe,
    derive channel state information in the valid subframe, and
    transmit the channel state information to the base station.

* * * * *